Feb. 28, 1950     E. S. DUNCAN     2,498,987
FISHING REEL
Filed Aug. 19, 1946     2 Sheets-Sheet 1
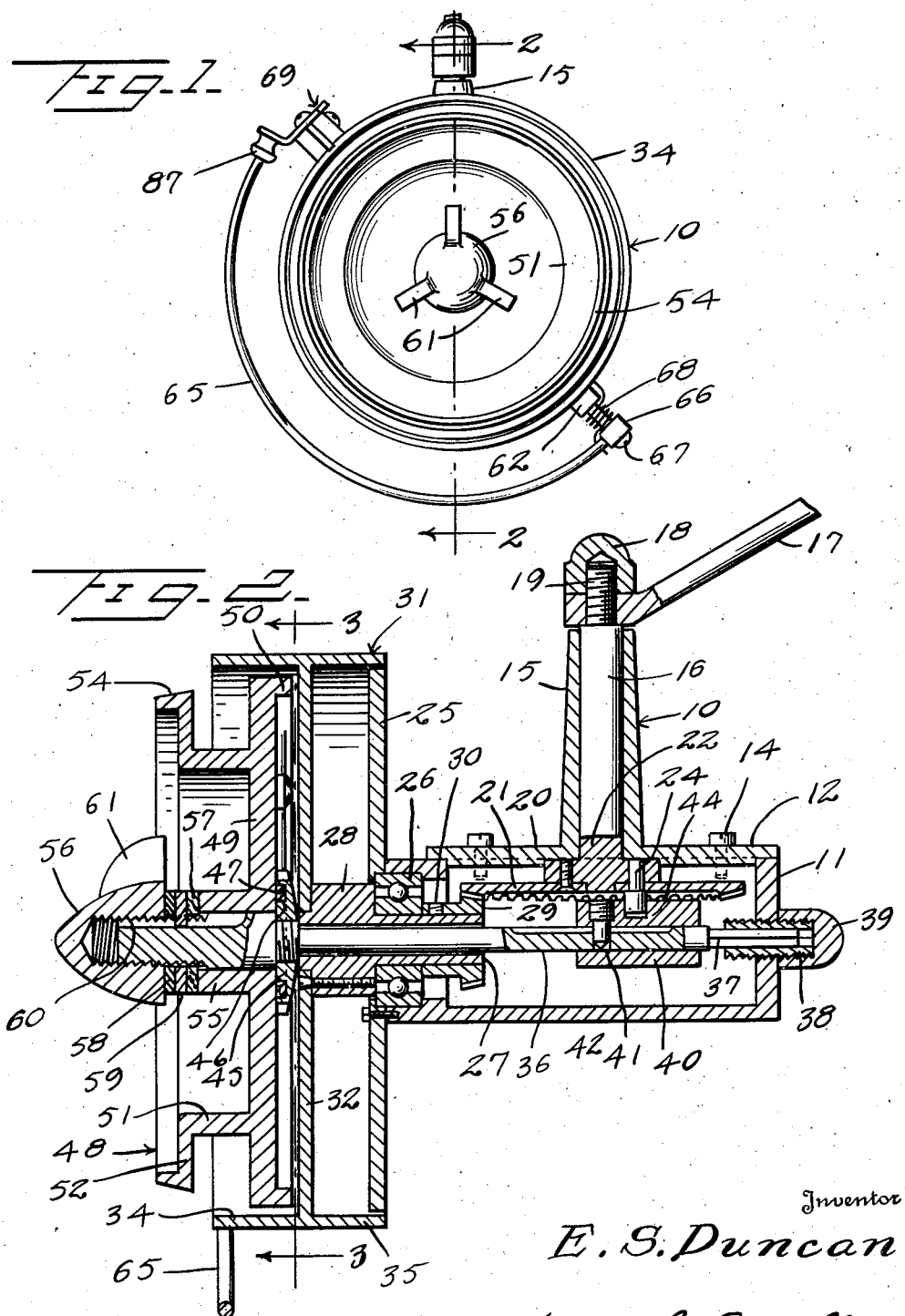
Inventor
E. S. Duncan
By Kimmel & Crowell
Attorneys Feb. 28, 1950 E. S. DUNCAN 2,498,987
FISHING REEL
Filed Aug. 19, 1946 2 Sheets-Sheet 2
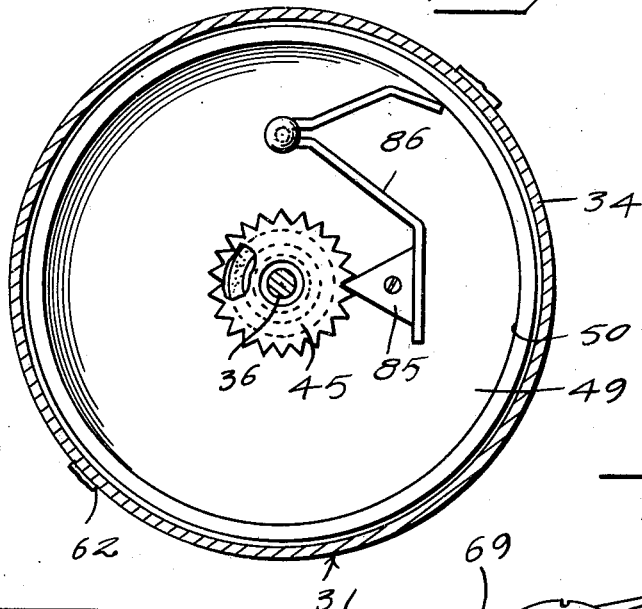
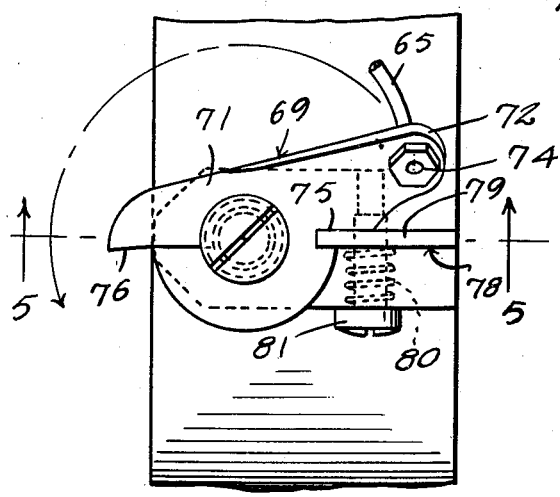
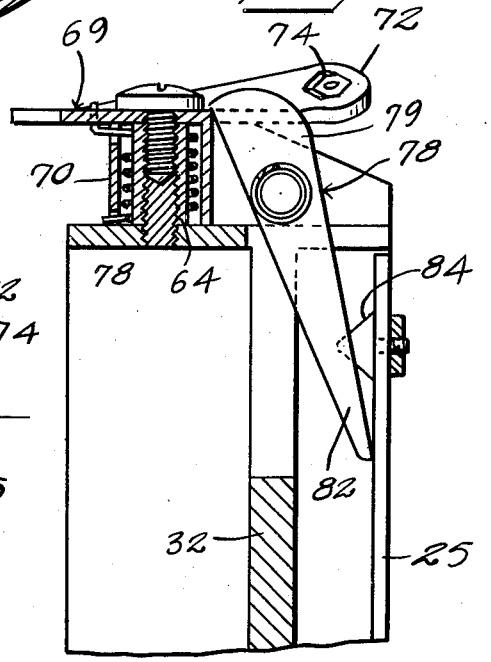
Inventor
E. S. Duncan
By Kimmel & Crowell
Attorneys Patented Feb. 28, 1950

2,498,987

UNITED STATES PATENT OFFICE 2,498,987

FISHING REEL

Everett S. Duncan, El Cerrito, Calif.

Application August 19, 1946, Serial No. 691,449

3 Claims. (Cl. 242—84.5)

This invention relates to fishing reels and more particularly to an improved casting reel.

An object of this invention is to provide an improved casting reel from which the line may be taken without rotating the spool, thereby reducing the drag on the cast line.

Another object of this invention is to provide an improved reel of the kind to be hereinafter described, having a small steel wire line recovery arm, semicircular in shape, which is pivotally mounted on a rotatable spool case about the spool, being spring-pressed to line engaging position for winding the line on the spool and a lock carried by the spool case for locking the recovery arm in disengaging position whereby the line may be cast with the minimum of drag and friction.

Another object of this invention is to provide an improved reel of this kind having a spring urged line recovering arm pivotally carried on the rotatable spool case which recovery arm is adapted to lie very close to the spool case in both positions whereby the arm is not likely to become entangled with any foreign objects while fishing in brushy streams or in close quarters.

Another object of this invention is to provide a spring urged line recovery arm on a fishing reel which may be locked in a line disengaging position for free casting and which is automatically moved to line engaging position upon rotation of the crank of the reel, being unlocked by a button fixed relative to the reel.

Another object of this invention is to provide a reel of this kind having a roller on the line recovery arm over which the line may be trained during recovery for minimizing the drag on the line and for preventing wear on the line at this time.

Still another object of this invention is to provide a reel of this kind having means for reciprocating the rotating reel case during recovery of the line, together with the line recovery arm, for winding the line evenly on the spool.

A further object of this invention is to provide means for lubricating the spool while being rotated by the drag of the catch.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a front elevation, partly broken away of my improved reel.

Figure 2 is a vertical section taken on the line 2—2 of Figure 1.

Figure 3 is a vertical section taken on the line 3—3 of Figure 2.

Figure 4 is a fragmentary side elevation of the reel showing the spool case lock.

Figure 5 is a fragmentary detail section taken on the line 5—5 of Figure 4.

Referring to the drawings the numeral 10 designates generally a fishing reel constructed according to an embodiment of this invention. This reel is adapted to be attached to a rod or pole on the lower side thereof, and for right handed fishermen the crank or handle of the reel is on the left side of the rod. The crank handle extends at right angles to the pole and the axis of the spool is parallel to the direction of the pole whereby the line being cast is drawn from the end of the spool at right angles to the windings whereby the line may be taken from the reel without rotating the spool.

The reel 10 is formed with a gear housing 11 which may be annular in plan view thereof. The gear housing 11 is formed with an open top side and a cover 12 is secured to the housing 11 by bolts or screws 14 or other suitable attaching devices. The cover 12 is formed with a tubular crank shaft bearing 15 extending upwardly therefrom. A crank shaft 16 is rotatable in the bearing 15 and a handle 17 is fastened to the outer end thereof with an end nut 18 engaging the outer threaded portion 19 of the shaft 16. The inner end of the shaft 16 is formed with an annular bearing flange or boss 20, to which is attached a ring gear 21 rotatable in the housing 11. The ring gear 21 is secured to the boss 20 by a screw 22 and a downwardly extending stud or lug 24 spaced outwardly a short distance from the center or axis of the ring gear 21.

An annular disc 25 is fixed to the housing 11 on one side thereof having the axis thereof aligned with the center of the depth of the housing 11. The housing 11 is formed with an annular opening on one side thereof and the disc or wall 25 is formed with an opening in the center aligning with the opening of the wall 25. A bearing 26 is secured in the openings of the disc 25 and housing 11 by having the outer race thereof pressed firmly into these openings. A tubular shaft 27 having an enlarged hub 28 on the outer end is pressed through the inner race of the bearing 26 and frictionally secured thereto. A pinion gear 29 is fixed on the shaft 27 by a set screw 30 and engages the ring gear 21.

An annular spool case 31 having a central disc 32 is fixed onto the hub 28 and is adapted to be rotated thereby. The spool case 31 is formed with a disc 32 having forwardly and rearwardly extending annular flanges 34 and 35 respectively. The rear flange 35 is adapted to engage over the edges of the fixed plate 25 for closing the space between the plate 25 and rotatable disc 32.

A central spool shaft 36 is slidable in the shaft 27 and extends through the housing 11 through the pinion gear 29 and under the ring gear 21. The shaft 36 is squared off at its inner end as at 37 and is slidably supported in an elongated square bearing 38 which may be threaded into the housing 11 and closed by a bearing cap 39 on the outer side of the bearing 38. A rectangular thrust bearing block 40 is fixed on the shaft 36 beneath the ring gear 21 by a set screw 41 engaging through the block 40 and into a transverse bore 42 in the shaft 36. The block 40 is formed with a transverse slot 44 on the upper side thereof into which the lug 24 is adapted to engage whereby rotation of the ring gear 21 will cause reciprocation of the shaft 36.

A ratchet gear or click 45 is threaded onto the shaft 36 outwardly of the rotatable plate 32 and is formed on its outer face with an annular groove 46 in which a lubricating felt ring or washer 47 is seated. A spool 48 is loosely carried on the outer end of the shaft 36. The spool 48 is formed of an annular inner disc 49 having an inwardly extending annular flange 50 about the periphery thereof, an annular body 51 having a vertical annular front wall 52, a forwardly extending annular flange 54 about the periphery of the wall 52, and a hub 55 loose on the shaft 36. On the shaft 36 at its outermost end there is a nut 56 for tensioning the spool on the shaft 36. Between the nut 56 and hub 55 there are provided a felt lubricating washer 57 adjacent the hub 54, a rubber washer 58 adjacent the nut 56, and a brass washer 59 between the felt washer 57 and rubber washer 58, the brass washer being keyed into a slot 60 in the shaft to hold the washers against rotation with the spool 48. The nut 56 is provided with outwardly extending ears 61 for readily tightening or loosening the nut 56 with the fingers of an operator. The flange 34 of the case 31 partly overlies the spool 48 as shown in Figure 2.

On the outer side of the flange 34 there is fixed a radially extending pin 62 and diametrically opposite therefrom a radially extending pin 64 is fixed. A semicircular bar 65 is pivotally carried on the pins 62 and 64. The bar or line engaging member 65 may be made of suitable wire of a diameter greater than the casing 31 and is formed at one end with a nut 66 engageable over the pin 62 and a screw 67 through the nut 66 and pin 62 constantly urged the bar 65 to one side of the casing 31 as shown in Figure 1.

A locking member 69 is pivotally mounted on the opposite pin 64. The member 69 comprises a tubular hub 70 about the pin 64 and a flat locking bar 71 fixed on the upper end of the hub 70. The locking bar 71 is formed with an ear 72 twisted upwardly into which the bar 65 may be secured by a nut 74. The ear 72 is further formed with a radial notch 75 behind the nut 74 and a flat edge 76 on the opposite side of the bar 71 for engaging a keeper 77 for locking the bar 65 in selected position. A spring 78 about the pin 64 constantly urges the bars 69 and 65 to a line engaged position. For locking the member 69 and bar 65 in each extreme position a radially extending keeper 78 is pivotally mounted on the casing 31 having an upper end 79 engageable in the slot 75 and with the edge 76 selectively. A coil spring 80 about the pivot 81 of the keeper 78 constantly urges the keeper 78 into engagement with the locking member 69. The other elongated end 82 of the keeper 78 bears against the inner side of the fixed disc 25. A lock releasing button 74 is fixed on the disc 25 for engaging the lever arm 82 upon rotation of the spool case 31 when the bar 65 is in line disengaged position. The button 84 is convex so the arm 82 may readily slide over it when the case 31 is rotated.

The spool is stationary relative to the casing 31 and is rotated only by the drag of a catch. The click of the spool is effected by a pawl 85 engaging in the ratchet 45, the pawl being pivotally mounted on the rear wall of the spool 48 and held in position by a wire spring 86.

A steel grooved roller 87 is carried by the bar 65 over which the line may be trained when recovering the line by rotation of the case 31 thereby reducing the drag on the reel and lessening the wear on the line.

In the use and operation of this reel 10, the line is wound on the spool 48 in a conventional manner. The bar 65 is in line engaging or unlocked position, and the line is passed under the bar 65, thence through the eyes on the pole.

For casting, the line on the pole is held by the thumb of the operator and the bar is moved to its locked line disengaging position as shown in Figures 1 and 5, where the keeper 78 engages in the slot 75 to hold the bar 65 in this line free position. As the line comes off the spool it slides over the flange 54 axially from the spool, whereby the spool remains still during the entire casting procedure.

Upon rotating the crank 17 to rotate the spool case 31 for recovering the line, the lever arm 82 rides over the button 84 releasing the bar 65 and the springs 68 and 78 move the bar 65 to the other side of the casing 31, catching the line thereunder, and the edge 76 engaging the keeper 78. Rotation of the case 31 causes the line to slide down the bar 65 and ride over the roller 87 whereupon the line is wrapped on the spool 48. Upon rotation of the case 31 the spool 48 is reciprocated to permit the line to be wound evenly on the spool 48. The drag on the spool 48 is controlled by the nut 56 and is in no way affected by rotation of the spool case 31. When the drag is sufficient to rotate the spool, the felt washers 47 and 57 soaked with oil, provide for lubrication of the spool hub 55 on the shaft 36.

I do not mean to confine myself to the exact details of construction herein disclosed but claim all variations falling within the purview of the appended claims.

Having thus described my invention, what I claim is:

1. An improved reel of the kind described comprising a crank, a ring gear on said crank, pinion gear engaging said ring gear, a housing for said gears having an annular side wall, two opposed openings in said side wall, an anti-friction type bearing carried by said housing in one of said openings, a tubular shaft for said pinion gear rotatably mounted in said bearing, a non-rotatable shaft having a rectangular portion slidably supported in a rectangular bearing fixedly mounted in said other opposed opening and extending through said tubular shaft, a spool case carried by said tubular shaft and rotatable therewith, a spool rotatable on said non-rotatable shaft, ratchet means operatively associated with said spool, tensioning means on said spool for holding said spool against rotation, a spring pressed looped wire line engaging member pivotally carried by said spool case, locking means carried by said case and said line engaging member for locking said member in one position and means disengaging said locking means upon rotation of said crank whereby said member is moved to the original line engaging position.

2. A device as in claim 1 in which said tentioning means includes a wing nut adapted to threadedly engage said non-rotatable shaft, a plurality of oil impregnated felt washers rotatably mounted on said non-rotatable shaft between said nut and said spool and an oil impervious washer keyed to said non-rotatable shaft and disposed between said felt washers.

3. A device as in claim 2 in which said ratchet means comprises a spring biased pawl carried by said spool and a disc having peripheral toothing fixedly carried by said non-rotatable shaft adjacent to said spool and formed with an annular groove adapted to retain another oil impregnated felt washer whereby rotation of said spool relative to said non-rotatable shaft will be indicated by the checking sounds caused by the movement of the pawl over the peripheral toothing and said felt washers will provide lubricating bearing surfaces for said tensioning means.

EVERETT S. DUNCAN.

REFERENCES CITED

The following references are of record in the file of this patent:

UNITED STATES PATENTS

| Number | Name | Date |
|---|---|---|
| 2,344,209 | Lowe | Mar. 14, 1944 |

FOREIGN PATENTS

| Number | Country | Date |
|---|---|---|
| 380,939 | Great Britain | Sept. 29, 1932 |
| 409,833 | Great Britain | May 10, 1934 |
| 498,460 | Great Britain | Jan. 9, 1939 |